Dec. 15, 1936.  H. M. JOHNSTON  2,064,166

PITMAN FOR MOWERS OR LIKE MACHINES

Filed May 23, 1935

INVENTOR:
HOWARD M. JOHNSTON

BY  ATTORNEY.

Patented Dec. 15, 1936

2,064,166

UNITED STATES PATENT OFFICE 2,064,166

PITMAN FOR MOWERS OR LIKE MACHINES

Howard Milton Johnston, Toronto, Ontario, Canada, assignor to Massey-Harris Company, Limited, Toronto, Ontario, Canada Application May 23, 1935, Serial No. 22,980

8 Claims. (Cl. 287—89)

This invention relates to pitman connections and more particularly to pitman connections for mowers and like machines.

The object of the invention is to provide a pitman having a maximum amount of self-alignment while maintaining the various parts of the pitman and of the machine with which it is associated in proper operating relation at all times and having a connection at its grassward end which may be readily and quickly attached to or detached from the cutting mechanism of the mower or other desired operating part.

The invention consists in a pitman provided at its grassward end with a pair of strip members adapted to receive and position therebetween a spherical bearing member, a cam surface on the outer faces of each of the strip members and a separate clamping member provided with cam surfaces corresponding with the aforementioned cam surfaces and adapted for engagement therewith whereby the strip members may be forced towards each other to clamp the bearing member therebetween. Means are also provided on the clamping member in association with means on the strip members for forcing the strip members apart. Means may also be provided for holding the clamping member in clamping position.

The invention also consists in a connection for the stubbleward end of the pitman comprising a light-weight plate or strap of high quality material, a plurality of bearing sockets carried by the strap and a bearing member provided with segmental surface bearing portions adapted for engagement with the bearing sockets.

The invention will now be described with reference to the accompanying drawing, in which Figure 1 is a side elevation of a pitman embodying the invention;

Figure 1:
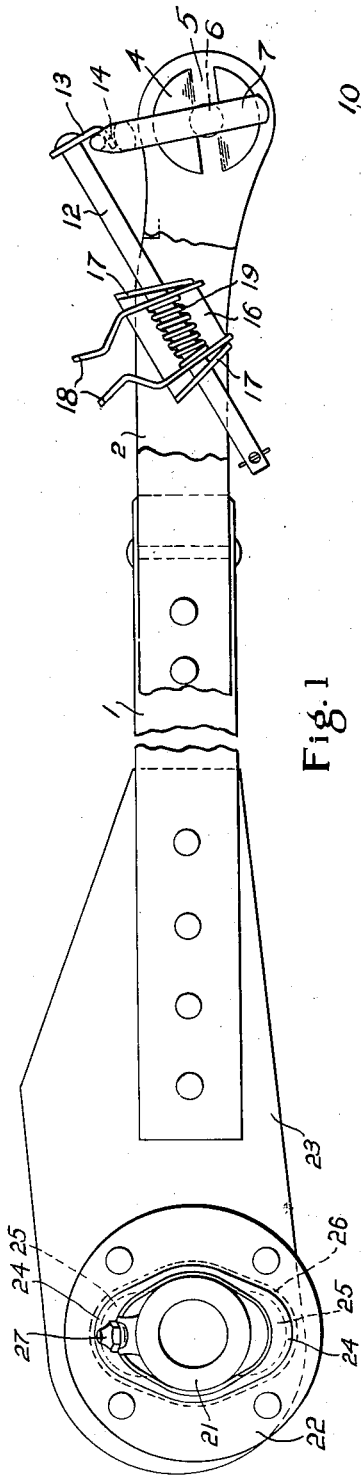

In the drawing 1 is the pitman frame member and, with reference to the grassward end, 2 are metal strips bolted or otherwise secured to the frame member 1 and provided, adjacent their ends, with rounded bearing sockets 3 adapted to receive the spherical bearing member of the cutting bar or other element of the mower or other machine desired to be driven by the pitman. Cam surfaces 4, each provided with a groove 5, are formed on the outer faces of the strips 2 opposite the bearing sockets. Holes 6, disposed centrally of the cam surfaces, may be provided in the strips 2.

A clamping member 7 is provided with opposing arms 8 adapted to enter the groove 5 and having cam surfaces 9 corresponding to and adapted for engagement with the cam surfaces 4.

Figure 2:
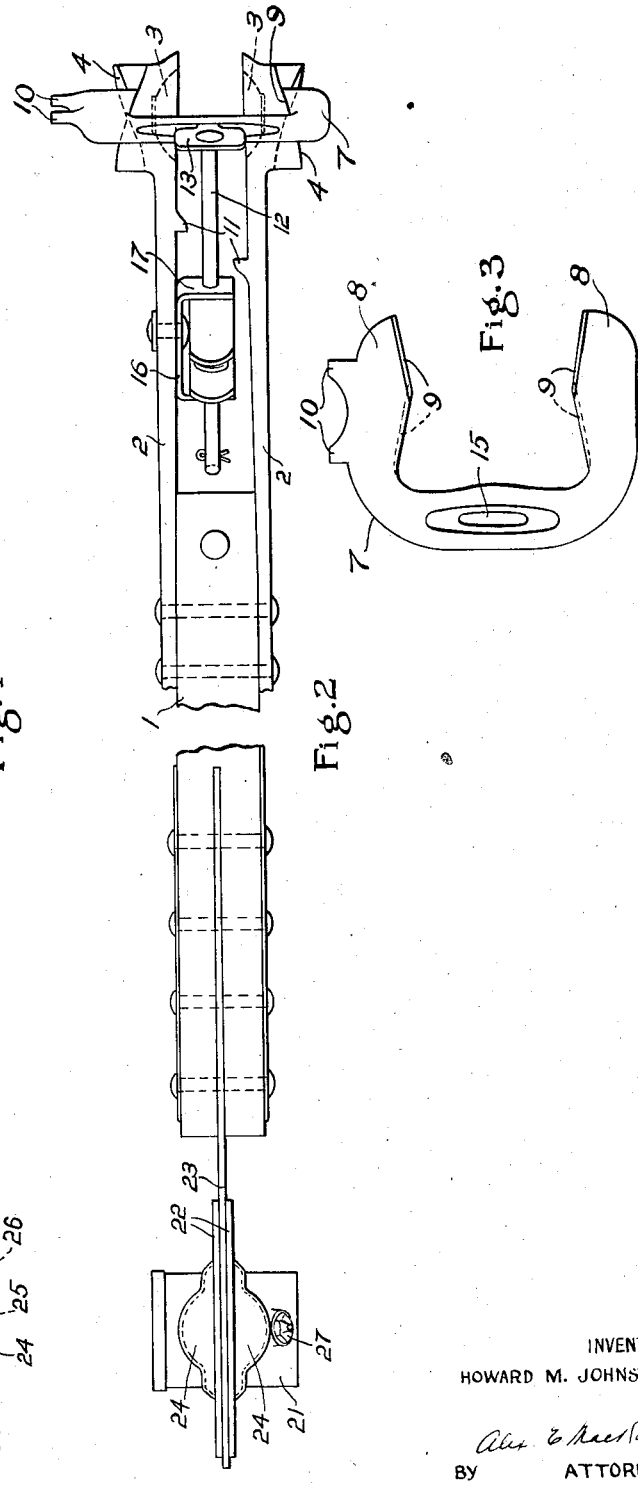
Figure 2 is an enlarged top plan view of the pitman.
Figure 3:
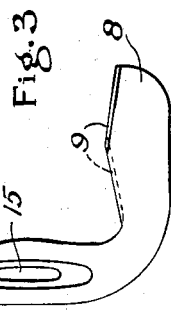
Figure 3 is a plan of the clamping member.

Means are provided for forcing the strips 2 apart consisting of a pair of projections 10 formed on one arm 8 of the clamping member and a lug 11 on each strip 2. Reference to Figures 2 and 3 will indicate how this releasing means operates, the projections 10 being inserted transversely of the space between the strip members 2 so that the projections 10 engage the lugs 11. Turning the members 7 in a clockwise direction will then obviously force the strips apart.

Means are also provided for holding the member 7 in clamping position on the strips 2 as shown in Figure 1. This consists of a bar 12, carrying at one end a plate 13 having an inturned flange 14 adapted for engagement with a recess or hole 15 in the member 7, and a locking means therefor comprising a supporting plate 16 pivotally secured to one of the strips 2 and carrying angularly disposed flanges 17 through which the bar 12 freely passes, a pair of inclined locking plates 18 between which is positioned on the bar 12 a spring 19. The spring 19 normally forces the edges of the apertures in the plates 18 into gripping engagement with the bar 12 locked against longitudinal movement and thus holding the clamping member 7 in position. Manual pressure of the plates 18 releases the gripping action and the bar is then freely movable longitudinally and rotatably when the inturned flange 14 releases the clamping member.

Referring now to the stubbleward end of the pitman, there is provided on the usual bearing 21 for the wrist pin of a flywheel a joint which permits movement of the bearing relative to the connecting portions of the pitman in order to avoid undue stresses between the bearing and the wrist pin occasioned by distortion of the pitman in continued use. This joint comprises two oppositely disposed plates 22 secured to the end plate 23 of the pitman and shaped to form sockets 24 and the segmental bearing portions 25 on the bearing 21. In the drawing, 26 represents the centrally disposed opening in the plate 23. It will be observed that the central portion of each plate 22 is pressed out to provide sockets for the segmental bearing portions 25. Thus the bearing 21 always retains its normal relation to the wrist pin bearing surface and this joint permits automatic adjustment between the pitman rod and the bearing 21 in case the pitman rod becomes slightly distorted, as is sometimes the case. A grease-applying nipple 27 may be provided.

In connecting the pitman to the bearing member of the cutting bar, the operator first spreads the strips 2 apart by means of the clamping member 7 and places the sockets 3 in position on the cutting bar. The clamp 7 is then inserted by sliding its arms 8 into the grooves 5 and rotating it in a counterclockwise direction. Engagement of the cam surfaces 9 of the clamp with cam surfaces 4 of the strips forces the strips together to close the sockets 3 about the cutting bar bearing. The normal gripping position of the clamp 7 is shown in Figures 1 and 2 and as locked in this position.

The construction of the grassward end of the pitman in addition to providing for easily operated and effective quick-release features, makes it possible to use relatively light weight material and still secure the required strength in this end of the pitman. It will be observed that the maximum pressure exerted by the clamping member is directed substantially axially of the ball bearing on the cutting bar. From the point of view of convenience of operation, the quick-release features of a pitman are of great importance. It will be appreciated that in long use and/or through accident a pitman rod may become somewhat distorted or out of alignment and in that condition the bearing on the grassward end exerts an uneven or abnormal pressure on portions of the wrist pin, causing undesirable wear and strain in such rapidly moving parts. The construction herein provided overcomes that difficulty in that the joint automatically takes care of the effect of the distorted pitman rod.

I claim:

1. A pitman for mowers or the like comprising a rod, a pair of strip members secured to one end of said rod, a socket in the inner side of the free end of each strip, a cam surface on the outer side of the free end of each strip and a substantially U-shaped clamping member the leg portions of which engage the cams on said strip members, said clamping member being turnable on an axis passing through said leg portions at a point removed from the connecting portion of the U to close the strip members as the clamping member is turned.

2. A pitman for mowers or the like comprising a rod, a pair of spaced strip members secured to one end of said rod, each having a socket on the inner side of its free end and a cam surface on its outer side immediately opposite the socket and a substantially U-shaped clamping member the leg portions of which engage the cams on said strip members, said clamping member being turnable on an axis substantially parallel to the connecting portion of the U and passing through said legs at a point removed from the connecting portion of the U to close the strip members as the clamping member is turned.

3. A pitman as defined in claim 2, wherein said strip members have lugs and said clamp means for cooperating with said lugs to force said strip members apart.

4. A pitman as defined in claim 2, wherein an adjustable locking device is mounted between said strip members and is arranged to have cooperating engagement with said clamp whereby said sockets are held in operating position.

5. A pitman as defined in claim 2, wherein an adjustable locking device is mounted between said strip members and is arranged to have cooperating engagement with said clamp whereby said sockets are held in operating position, said locking device comprising a bar having a hook adapted to engage the clamp and resilient means for holding said bar in adjustable positions.

6. In a pitman having a pair of resilient straps on one end thereof, said straps having cam portions on the outside surfaces thereof, means for forcing said straps towards each other comprising a U-shaped clamping member the leg portions of which are adapted to engage said cam portions, said clamping member being turnable about an axis passing through substantially the midpoints of the cam-engaging portions of said legs.

7. A pitman for mowers or the like comprising a rod, a pair of spaced straps secured to one end of said rod, each having a socket on the inner side of its free end and a cam surface on its outer side immediately opposite the socket and a separable U-shaped clamp the leg portions of which are adapted to engage said cam surfaces, said clamp being turnable about an axis passing through substantially the midpoints of the cam-engaging sections of the leg portions and of the cam surfaces whereby cooperation of the leg portions with the cam surfaces acts to draw said members together to bring said sockets into operative position.

8. A pitman as defined in claim 7 having a depressed channel diametrically of each of said cam surfaces to permit ready placement and withdrawal of said clamping member when said sockets are in inoperative position.

HOWARD MILTON JOHNSTON.